United States Patent [19]

Kawabata et al.

[11] 4,251,297
[45] Feb. 17, 1981

[54] METHOD FOR MANUFACTURING MAGNETIC HEAD USING BORONIZING TREATMENT

[75] Inventors: Hidetsugu Kawabata, Hirakata; Yuji Nagata, Osaka; Keizo Ishiwatari, Kobe; Toshio Shimizu, Nara, all of Japan

[73] Assignee: Matsushita Electric Industrial Co., Ltd., Japan

[21] Appl. No.: 1,592

[22] Filed: Jan. 8, 1979

Related U.S. Application Data

[63] Continuation of Ser. No. 821,408, Aug. 3, 1977, abandoned.

[30] Foreign Application Priority Data

Aug. 16, 1976 [JP] Japan .................. 51-98020
Jan. 18, 1977 [JP] Japan .................. 52-4583
Feb. 17, 1977 [JP] Japan .................. 52-16968

[51] Int. Cl.$^3$ .............................................. G11B 5/42
[52] U.S. Cl. ........................... 148/121; 29/603; 148/6; 148/122; 427/127; 427/252; 427/383.9
[58] Field of Search ................... 148/6, 121, 122; 427/127, 252, 287, 383 D; 29/603

[56] References Cited

U.S. PATENT DOCUMENTS

| 3,787,245 | 1/1974 | Kunst | 427/252 |
| 3,886,025 | 5/1975 | Risemen | 29/603 |
| 3,922,038 | 11/1975 | Scales | 148/16.5 |
| 4,011,107 | 3/1977 | Hayes | 427/383 D |
| 4,017,966 | 4/1977 | Morell et al. | 29/603 |

FOREIGN PATENT DOCUMENTS

| 713972 | 7/1965 | Canada . | |
| 44-11620 | 5/1969 | Japan . | |
| 49-36250 | 9/1974 | Japan | 29/603 |
| 50-120612 | 9/1975 | Japan . | |
| 50-137116 | 10/1975 | Japan . | |
| 950767 | 2/1964 | United Kingdom . | |

OTHER PUBLICATIONS

Condensed Chemical Dictionary, Van Nostrand Reinhold Co., 8th Ed., c 1971, p. 670.

Primary Examiner—John D. Smith
Attorney, Agent, or Firm—Spencer & Kaye

[57] ABSTRACT

A magnetic head having a high wear resistance and high workability such as by grinding, and a method for manufacturing the same. According to this method, at least a portion of that surface of the core forming the magnetic head or shielding case, which is to be brought into contact with a magnetic recording medium, is subjected to a boronizing treatment to form a boronized layer.

7 Claims, 7 Drawing Figures

METHOD FOR MANUFACTURING MAGNETIC HEAD USING BORONIZING TREATMENT

CROSS REFERENCE TO RELATED APPLICATIONS

This application is a continuation of application Ser. No. 821,408, filed Aug. 3, 1977, abandoned.

The present invention relates to a magnetic head and method for manufacturing the same, and it provides a magnetic head having a high wear resistance and method for manufacturing the same.

The magnetic head is generally used in slidable contact with a magnetic recording medium such as a magnetic tape and wear of the head is more or less unavoidable. This is a significant factor in determining the durability of the head.

Magnetic materials such as ferrite, sendust and permalloy have been used as the head material to manufacture a core or a shielding case. Of those materials, ferrite is a good material for the head core because of its high wear resistance but has a drawback in that it produces noise inherent in the ferrite due to the slidable movement of the tape. Also, it exhibits a small S/N ratio. Furthermore, it is inevitably expensive as compared to permalloy because it requires a special treatment to prevent the occurrence of microcracking. Sendust is superior to ferrite in its sound characteristic and shows less wear than permalloy, but it is brittle and it is difficult to work such brittle material. However, as the working technology has been improved recently, it has been used as the core material for audio heads. On the other hand, permalloy, which is an Fe-Ni magnetic alloy, is superior in its sound characteristic and the workability is far superior to that of ferrite and sendust. Therefore, permalloy has been widely used as a head material. As for the material for the shielding case, permalloy has been exclusively used because of its workability, that is, the readiness of deep drawing. However, permalloy as the material for the core and the shielding case has a significant drawback in its wear resistance. In order to improve the wear resistance, an approach has been proposed to coat a surface of the material, which is to be brought into sliding contact with the tape, with alumina ($Al_2O_3$) or the like by the plasma arc spraying technique. This approach, however, has problems in applying it to audio head with respect to an overall aspects such as productivity and cost/performance. As another material which improves the wear resistance of permalloy, a hard permalloy has been known which consists of Nb, V, Si, Ti or Cr in addition to ingredient elements Ni, Fe, Mo and Cu. Although such a hard permalloy has an improved wear resistance as compared to conventional permalloy, it does not yet have a sufficient wear resistance. Moreover, the hard permalloy varies over a wide range depending on the dopant and the composition and shows different properties such as wear resistance or workability (moldability). In this material, the moldability is incompatible with wear resistance. Thus, for the material for the shielding case which requires high moldability, a hard permalloy having lower wear resistance than a core material must be used.

The slide contact portions of the magnetic head with the tape include a head core, an outer casing primarily composed of a shielding case, a spacer and a resin body. In actual wear of the head, they are related to each other. The change in electrical characteristics of the head and the change in sound characteristic due to wear are finally determined by the change in the contour of the core and positional relation between the core and the tape. Where the shielding case which occupies a substantial portion of the head-to-tape sliding contact surface has a low wear resistance, pressure may be concentrated in the core during the use of the magnetic head so that the core is worn more and more, or the head is not uniformly worn to impart an adverse affect on the positional relation between the tape and the core or to cause an increased difference in the sensitivity between channels. Accordingly, not only the wear resistance of the core but also the wear resistance of the shielding case is a significant factor in determining the performance and durability of the head.

The present invention has as an object improving the wear resistance of the head and enabling the penetration of boron into the tape sliding surface portion including the shielding case or core consisting of permalloy, that is, it applies a boronizing treatment to form a wear resistant layer to provide a magnetic head having high workability, high productivity and high wear resistance.

Heretofore, as boronizing techniques for iron, there has been studied a gas boronizing method using a boric gas atmosphere such as boron chloride, a solid (powdered) boronizing method in which iron is buried and heated in boronizer powders, a paste method in which paste boronizer is applied on iron, and a liquid boronizing method or electrolytic boronizing method using immersion or electrolyte in a boronizer. However, the surface hardening treatment techniques for mechanical parts made of iron have not been directly applicable in improving the wear resistance of the head for several reasons described below:

1. Since the mechanism of wear includes complex physical and chemical processes and the condition of wear significantly changes depending on the operating condition and companion material, the anti-wear treatment of the mechanical part does not always lead to improvement of the wear resistant characteristics of the magnetic head to the magnetic tape.

2. Depending on the particular surface treatment, the influence on the magnetic property of the material significantly changes. The condition of heat treatment must be suited to a particular magnetic material.

3. The treatment condition must satisfy severe requirements of dimensional accuracy and work accuracy (accuracy of finishing) required for the magnetic head.

4. The workability and the productivity of the magnetic head must be high.

The inventors of the present invention have studied the boronizing techniques described above in detail. They first tried to apply the solid boronizing method using permalloy powders to the magnetic head and invented a highly wear resistant magnetic head and method for manufacturing the same. The present invention will now be described in detail with reference to the accompanying drawings, in which.

Figure 1A:
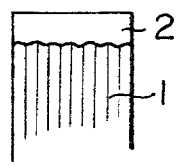
FIGS. 1A and 1B are sectional views of boronized layers of permalloy and iron respectively.
Figure 1B:
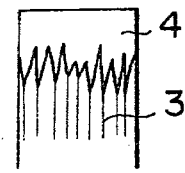

FIG. 1A shows a schematic diagram illustrating the interface between a boronized layer and a material which is permalloy consisting of an Fe-Ni magnetic alloy. In FIG. 1A, numeral 1 denotes permalloy and numeral 2 denotes the boronized layer. For the purpose of comparison, FIG. 1B shows a schematic diagram of the interface when iron material has been subjected to the boronizing treatment. In FIG. 1B, numeral 3 denotes the iron material and numeral 4 denotes the boronized layer. Where the material consists of pure iron or it includes a relatively small amount of nickel, the boronized layer is acicular as shown in FIG. 1B. On the other hand, where the permalloy is used, the interface is relatively flat as shown in FIG. 1A. The latter is sufficient to meet the requirement of dimensional accuracy for the magnetic head. Furthermore, the reduction of permeability in the latter is as a whole within the decrement of the thickness of the permalloy caused by the formation of the boronized nonmagnetic layer. The flatness of the interface is materially improved to compare with that where iron is used as the base material. Although it is generally recognized that the adherence of the layer to the base material is deteriorated as the flatness is increased, it has been found that peel-off of the boronized layer acting as the wear resistant layer does not occur at all during the grinding step in the manufacture of the head and during the wear test by the magnetic tape after the magnetic head has been completed, and hence the resulting material is sufficient to meet the requirement of adherence for the magnetic head.

Because the wear resistant layer is substantially nonmagnetic, the overall permeability of the material decreases after the boronizing treatment when it is compared with that before the treatment. Accordingly, it is preferable that the treatment not be applied to the entire surface of the object including the front and back surfaces but that it be applied to only selected requisite areas such as the sliding contact surface with the tape.

In this respect, it has been found that of the several known boronizing treatments the solid boronizing technique in which the material is housed in a jig with only a predetermined portion of the material being exposed and then buried in powdered boronizer is suited to form the wear resistant layer for a magnetic head. Particularly, the solid boronizing technique using powder is advantageous in that the boronizer can be repeatedly used.

The conditions of treatment are now explained. For a primary agent acting as a boron source, boron carbide of high purity is available inexpensively. However, carbon which is an ingredient element of boron carbide may cause carburizing, which in turn penetrates into the permalloy to increase coercivity and reduction of the permeability. However, no such carburizing phenomenon was observed in the experiment by the inventors. It has also been found that the increase of coercive force and the decrease of permeability were within an allowable range which enabled practical use in the magnetic head. When pure boron was used as the primary agent, the hard layer was hardly formed and it was difficult to control the thickness of the layer by changing the condition of treatment. Accordingly, boron carbide is superior to pure boron in industrially forming a wear resistant layer on a magnetic head.

The condition of heat treatment in the boronizing treatment of the permalloy is described below. The heat treatment is effected at or above 800° C. Below this temperature, little boronized layer was formed even after extended treatment over a long time. In order to recover the permeability of the permalloy which has been reduced during the work such as blanking or forming, magnetic annealing is required. Since the boronizing temperature set forth above is close to the required magnetic annealing temperature, both treatments can be effected simultaneously.

In a manufacture of magnetic head, the grinding of the tape contact surface of the magnetic head after the magnetic head has been assembled is essential in order to assure smooth sliding contact of the magnetic head with the magnetic tape. Thus, special consideration must be paid to that portion to be ground when the boronizing treatment is applied to the front face of the magnetic head. Where the thickness of the boronizing layer is more than 150 $\mu$m, preferably more than 200 $\mu$m, the wear resistant layer of sufficient thickness will remain even after the layer has been ground by 100 to 150 $\mu$m so that the same dimensional tolerance of the head parts and the assembling tolerance as those for the prior art permalloy head can be maintained without sacrificing workability and productivity.

When an Fe-Ni alloy such as permalloy is subjected to the boronizing treatment, it is hard to form a thick boronized layer to compare with the treatment of iron. However, when an Fe-Ni magnetic alloy is subjected to the boronizing treatment in a hydrogen atmosphere using a boronizer consisting of boron carbide ($B_4C$) including various additives such as carbonate and borate, it is possible to form a boronized layer of the thickness of 200 to 300 $\mu$m through the treatment at 950° C. to 1000° C. for several hours. The amount of the boronized layer formed is materially increased as compared with the case where the treatment is effected in the air or in an inert gas atmosphere. Furthermore, since the treatment in hydrogen is compatible with the condition for magnetic annealing of the material, both treatments can be carried out simultaneously. In this case, the rate for lowering the temperature at the end of the boronizing treatment is matched with that of the magnetic annealing. Although annealing of the permalloy is generally carried out at a temperature between 1050° C. and 1200° C., it has been found that annealing at or above 950° C. poses no practical problem for the shielding case as well as the core with respect to permeability. Accordingly, where both treatments are carried out simultaneously, the higher the temperature, the thicker the boronized layer for a given condition. However, above 1100° C., which is beyond the melting point of the boronized layer of the permalloy, the product is deformed or the treatment agent deeply penetrates into the material and a smooth surface cannot be formed by grinding. It has been found by the inventors that the above melting point lay between 1000° C. and 1100° C.

The properties of the boronized layer are discussed below. The Vicker's hardness of the wear resistant layer obtained by boronizing the permalloy was in the order of 900 kg/mm$^2$ although it varied depending on the particular load and the particular condition of measurement, and it did not exceed 1500 kg/mm$^2$ for varying conditions of measurement and treatment. Accordingly, the boronized layer can be ground by a GC grinding stone essentially consisting of silicon carbide (SiC) and it can be ground by the same method as that for the permalloy. Furthermore, in the present invention, since the molding or blanking may be carried out for the permalloy having a high workability prior to the boronizing treatment, productivity is materially improved.

Table 1 below shows wear resistances for the permalloy and other materials after a wear test for 500 by a magnetic tape.

TABLE 1

| Material | Wear resistance to magnetic tape (Relative value) |
|---|---|
| Permalloy | 1 |
| Hard Permalloy | 1.3–2 |
| Boronized Permalloy | 4–6 |
| Sendust | 5–7 |
| Hot Pressed Ferrite | 15–25 |

As seen from Table 1, the wear resistance of the boronized permalloy to the magnetic tape is four to six times as high as that of the permalloy.

Several embodiments of the present invention and manufacturing methods therefor are given below.

EMBODIMENT 1

Figure 2A:
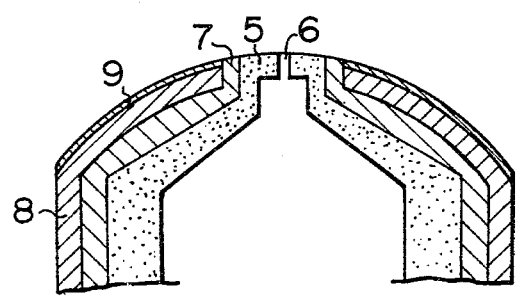
FIGS. 2A and 2B are sectional views of a major portion of one embodiment of a magnetic head of the present invention.
Figure 2B:
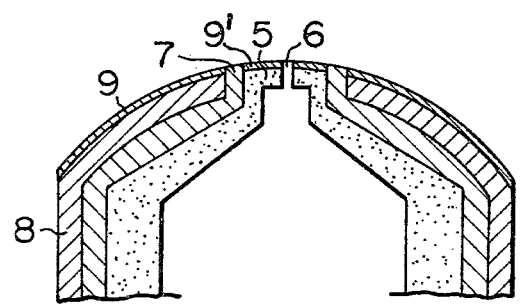

FIG. 2A shows an example of a structure of a magnetic head in accordance with the present invention. In FIG. 2A, numeral 5 denotes a core, 6 a gap, 7 a support plate made of zinc or resin, 8 a permalloy shielding case housing the head core 5 therein, 9 a boronized layer formed on the shielding case 8 at an area which is to be brought into sliding contact with a magnetic tape. In the present embodiment, the head core is made of hard permalloy or sendust. Alternatively, it may be a core subjected to the boronizing treatment. Reproducing frequency characteristics were measured and compared for two heads, one comprising a core made of hard permalloy which was housed in a permalloy shielding case and the other comprising a core made of hard permalloy which was housed in a permalloy shielding case having been subjected to the boronizing treatment. The result was that a level change at 10 kHz to 333 Hz after 500 hours tape run for the boronized shielding case was reduced by a rate of from 2 to 4. Particularly when sendust was used as the core material, since the wear of the boronized layer of the permalloy to the magnetic tape is close to that of the sendust, nonuniform wear of the head is minimum after long term use of the head. After 1000 hours tape run, the change in the reproducing frequency characteristic and the sound characteristic was scarcely observed. FIG. 2B shows an embodiment.

EMBODIMENT 2

Figure 3:
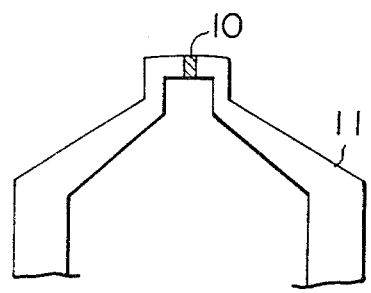
FIG. 3 is a sectional view of a major portion of another embodiment of the magnetic head of the present invention.

FIG. 3 shows a special application of the present invention in which the boronizing treatment is applied to a gap forming surface of the head core. In FIG. 3, numeral 10 denotes a boronized layer and 11 denotes a head core. In the present embodiment, the boronized layer serves not only to improve the wear resistance but also as a non-magnetic gap spacer eliminating the necessity of the insertion of glass or the like. As alternatives, the boronizing treatment may also be applied to a laminating surface of resin used in laminating the permalloy cores or on that area other than on the shielding case which acts as the slide contact area. While the boronizing treatment of the permalloy material was heretofore described particularly, it should be added that the wear resistance can also be improved by applying the boronizing treatment to the sendust.

Figure 4:
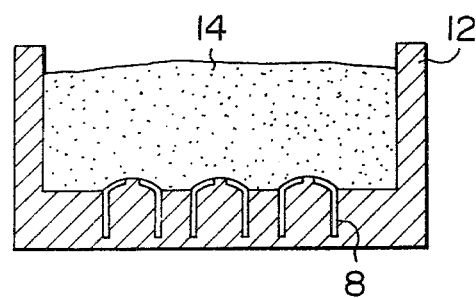
FIGS. 4 and 5 show jigs for forming the boronized layer on a sliding contact surface between a shielding case and a magnetic tape.
Figure 5:
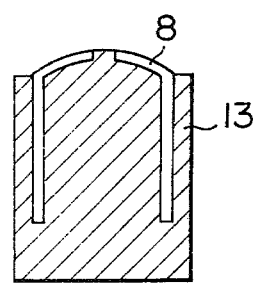

The methods for forming the boronized layers in the above embodiments are illustrated in FIGS. 4 and 5. In the figures, numerals 12 and 13 denote jigs made of graphite, which mount the shielding case 8 while exposing a portion thereof. Numeral 14 denotes, powdered boronizer contained in the cup-shaped jig 12. The powdered boronizer was reacted under the heat treatment condition described above to form a desired layer.

As described herein above, the present invention provides a magnetic head and method for manufacturing the same, which magnetic head has a high workability and productivity as those of a permalloy head and yet has a high wear resistance. Therefore, the present invention offers significant advantages in the industry.

What is claimed is:

1. A method for manufacturing a magnetic head assembly from components including a permalloy magnetic shielding case having a surface portion thereof adapted to be brought into sliding contact with a magnetic recording medium, said method comprising the steps of contacting said surface portion with a powdered boronizer comprising boron carbide, heating said permalloy shielding case including the surface portion thereof which has been contacted with said powdered boronizer in the temperature range between 950° C. and 1100° C. in a hydrogen atmosphere to magnetically anneal said permalloy shielding case and simultaneously convert said surface portion to a wear-resistant boronized layer, and lowering the temperature of said case including said boronized layer at a rate corresponding to a temperature lowering rate for magnetically annealing said permalloy shielding case.

2. The method of manufacturing a magnetic head assembly according to claim 1 wherein the thickness of said boronized layer is not less than 150 μm, and which further includes the steps of assembling said magnetic head and grinding the boronized layer on said shielding case to reduce the thickness of said boride layer.

3. A method of manufacturing a magnetic head assembly including a permalloy core and shielding case wherein said core and shielding case have surfaces adapted to be brought into contact with a magnetic recording medium, said method comprising the steps of contacting at least one of said surfaces with a powdered boronizer, heating in a hydrogen atmosphere said core and shielding case including the surface thereof which has been contacted with said powdered boronizer in the temperature range between 950° C. and 1100° C. to magnetically anneal said permalloy core and shielding case and simultaneously form a boronized layer having a thickness greater than 200 μm, lowering the temperature of said core and shielding case including said boronized layer at a rate corresponding to a temperature lowering rate for magnetically annealing said core and shielding case, and grinding each surface on which said boronized layer has been formed, said boronized surface having a Vicker's hardness not greater than 1500 kg/mm², a wear resistance substantially greater than that of non-boronized permalloy and a smoothness which permits said magnetic recording medium to slide smoothly thereon.

4. A method of manufacturing a magnetic head assembly including a core and a shielding case wherein said core and shielding case have surface portions adapted to be brought into contact with a magnetic recording medium, at least one of said core and shielding case being made of an Fe-Ni magnetic alloy, said method comprising the steps of contacting at least one of said surface portions with a powdered boronizer, heating in a hydrogen atmosphere in the temperature range between 950° C. and 1100° C. said core and shielding case including the surface portion thereof which has been contacted with said powdered boronizer to magnetically anneal said Fe-Ni magnetic alloy and simultaneously convert said surface portion to a boronized layer having a thickness greater than 200 μm thereby effecting a solid boronizing treatment, lowering the temperature of said core and shielding case including said boronized layer at a rate corresponding to a temperature lowering rate for magnetically annealing said core and shielding case, and grinding each surface on which said boronized layer has been formed, said boronized surface having a Vicker's hardness not greater than 1500 kg/mm², a wear resistance substantially greater than that of non-boronized permalloy and a smoothness which permits a magnetic recording medium to slide smoothly thereon.

5. The method of manufacturing a magnetic head assembly according to claim 4 wherein said powdered boronizer is boron carbide having an additive selected from the group consisting of carbonate and borate.

6. A method of manufacturing a magnetic head assembly including a core and a shielding case wherein said core and shielding case have surface portions adapted to be brought into contact with a magnetic recording medium, at least one of said core and shielding case being made of an Fe-Ni magnetic alloy, said method comprising the steps of contacting at least one of said surface portions with a powdered boronizer, heating in a hydrogen atmosphere in the temperature range between 950° C. and 1000° C. said core and shielding case including the surface portion thereof which has been contacted with said powdered boronizer to magnetically anneal said Fe-Ni magnetic alloy and simultaneously convert said surface portion to a boronized layer having a thickness greater than 200 μm thereby effecting a solid boronizing treatment, and lowering the temperature of said core and shielding case including said boronized layer at a rate corresponding to a temperature lowering rate for magnetically annealing said core and shielding core, and grinding each surface on which said boronized layer has been formed, said boronized surface having a Vicker's hardness not greater than 1500 kg/mm², a wear resistance substantially greater than that of non-boronized permalloy and a smoothness which permits a magnetic recording medium to slide smoothly thereon.

7. The method of manufacturing a magnetic head assembly according to claim 6 wherein said Fe-Ni magnetic alloy is annealed simultaneously with the heating of the surface contacted with said powdered boronizer, and wherein said surface and said Fe-Ni magnetic alloy are thereafter cooled simultaneously at a rate required for annealing of said alloy.

* * * * *